(12) United States Patent
Visscher et al.

(10) Patent No.: US 10,604,200 B2
(45) Date of Patent: Mar. 31, 2020

(54) ALL-TERRAIN VEHICLE

(71) Applicant: Ontario Drive & Gear Limited, New Hamburg (CA)

(72) Inventors: Peter Derek Visscher, Lakeside (CA); Keith Louis Heibein, Cambridge (CA)

(73) Assignee: Ontario Drive & Gear Limited, New Hamburg (CA)

( * ) Notice: Subject to any disclaimer, the term of this patent is extended or adjusted under 35 U.S.C. 154(b) by 286 days.

(21) Appl. No.: 15/842,101

(22) Filed: Dec. 14, 2017

(65) Prior Publication Data

US 2018/0162465 A1    Jun. 14, 2018

Related U.S. Application Data

(60) Provisional application No. 62/434,402, filed on Dec. 14, 2016.

(51) Int. Cl.

| | |
|---|---|
| *B62D 55/10* | (2006.01) |
| *B62D 55/108* | (2006.01) |
| *B62D 55/14* | (2006.01) |
| *B62D 55/06* | (2006.01) |
| *B60F 5/00* | (2006.01) |
| *B62D 55/084* | (2006.01) |
| *B62M 27/02* | (2006.01) |

(52) U.S. Cl.
CPC .............. *B62D 55/108* (2013.01); *B60F 5/00* (2013.01); *B62D 55/06* (2013.01); *B62D 55/10* (2013.01); *B62D 55/14* (2013.01); *B62D 55/084* (2013.01); *B62M 2027/022* (2013.01); *B62M 2027/027* (2013.01)

(58) Field of Classification Search
CPC ...... B62D 55/108; B62D 55/06; B62D 55/10; B62D 55/14; B62D 55/084; B60F 5/00; B62M 2027/027; B62M 2027/022
See application file for complete search history.

(56) References Cited

U.S. PATENT DOCUMENTS

| | | |
|---|---|---|
| 3,776,325 A | 12/1973 | Jespersen |
| 3,895,845 A | 7/1975 | Hale |
| 4,671,774 A | 6/1987 | Owsen |

(Continued)

*Primary Examiner* — Kevin Hurley
*Assistant Examiner* — Marlon A Arce
(74) *Attorney, Agent, or Firm* — Brunet & Co. Ltd.; Robert Brunet; Hans Koenig (57) ABSTRACT

An all-terrain vehicle configured to be propelled by an endless loop track and a suspension system therefore comprises first and second lower suspension rails pivotally attached to one another at a central pivot. First, second and third suspension supports are provided, each comprising a resilient element and a suspension strut, the suspension strut having an upper end pivotally connected to the frame and a lower end. The lower end of the suspension strut of the first suspension support is pivotally connected to the first lower suspension rail. The lower end of the suspension strut of the third suspension support is pivotally connected to the second lower suspension rail. The lower end of the suspension strut of the second suspension support is pivotally connected to the first lower suspension rail, the second lower suspension rail or the first and second lower suspension rails proximal the central pivot. This configuration advantageously provides improved driving dynamics for the vehicle when operated in rough terrain.

20 Claims, 10 Drawing Sheets

(56) References Cited

U.S. PATENT DOCUMENTS

| | | | |
|---|---|---|---|
| 4,718,508 | A | 1/1988 | Tervola |
| 4,998,591 | A | 3/1991 | Zaunberger |
| 6,050,914 | A | 4/2000 | Shimaya et al. |
| 6,782,960 | B2 | 8/2004 | Kanzler et al. |
| 6,953,408 | B2 | 10/2005 | Thompson |
| 7,040,426 | B1 | 5/2006 | Berg |
| 7,131,507 | B2 | 11/2006 | Wenger et al. |
| 7,478,817 | B1 | 1/2009 | Carrier |
| 7,673,711 | B1 | 3/2010 | Berg |
| 7,686,726 | B2 | 3/2010 | Thompson |
| 8,002,596 | B2 | 8/2011 | Wernicke et al. |
| 8,206,190 | B2 | 6/2012 | Lee |
| 8,439,152 | B2 | 5/2013 | Visscher |
| 8,627,907 | B2 | 1/2014 | Karrie et al. |
| 8,808,042 | B1 | 8/2014 | Hewitt |
| 8,844,665 | B2 | 9/2014 | Wenger et al. |
| 2002/0022415 | A1 | 2/2002 | Choi et al. |
| 2009/0039610 | A1 | 2/2009 | Karpik |
| 2013/0154345 | A1* | 6/2013 | Schulz ................ B62D 55/14 305/129 |
| 2014/0288763 | A1 | 9/2014 | Bennett et al. |
| 2015/0004854 | A1 | 1/2015 | Hewitt |
| 2016/0016639 | A1* | 1/2016 | Pard ................ B62D 55/244 180/193 |
| 2016/0362150 | A1* | 12/2016 | Kirchmair ............ B62D 55/104 |
| 2017/0057573 | A1* | 3/2017 | Gentry ................ B62D 55/108 |
| 2018/0111662 | A1* | 4/2018 | Ball ................ B62M 27/02 |
| 2018/0273142 | A1* | 9/2018 | Mangum ................ B62D 55/07 |

* cited by examiner

ALL-TERRAIN VEHICLE

TECHNICAL FIELD

This disclosure relates to all-terrain vehicles (ATV's), particularly all-terrain vehicles propelled by an endless loop track on ground or water. More particularly, the invention relates to track suspension systems for such vehicles.

BACKGROUND

All-terrain vehicles propelled by an endless loop track include suspension systems for attaching the track to the body of the vehicle. Previous suspension systems have suffered from one or more of the following problems: poor ride for occupants of the vehicle, poor handling of the vehicle while turning, poor load carrying capability, tendency to accumulate mud and debris, complicated maintenance, particularly if a break-down occurs in a remote location, lack of suitability for operation on both land and water (amphibious operation). Many of these problems are exacerbated when the vehicle is operated at high speeds. There remains a need for an all-terrain vehicle propelled by an endless loop track that is capable of ameliorating one or more of the aforementioned problems, particularly one that is suitable for operation at high speeds and/or in amphibious conditions.

SUMMARY

In one aspect, there is provided an all-terrain vehicle configured to be propelled by an endless loop track, the vehicle comprising: a vehicle frame; a track drive wheel rotatably attached to the frame and engaged with an inside surface of the track; a plurality of track idler wheels engaged with an inside surface of the track and rotatably connected to first and second lower suspension rails pivotally attached to one another at a central pivot; first second and third suspension supports, each comprising a resilient element and a suspension strut, the suspension strut having an upper end pivotally connected to the frame and a lower end; and, wherein the lower end of the suspension strut of the first suspension support is pivotally connected to the first lower suspension rail, the lower end of the suspension strut of the third suspension support is pivotally connected to the second lower suspension rail and wherein the lower end of the suspension strut of the second suspension support is pivotally connected to the first lower suspension rail, the second lower suspension rail or the first and second lower suspension rails proximal the central pivot.

In another aspect, there is provided a suspension for an all-terrain vehicle configured to be propelled by an endless loop track, the suspension comprising: first and second lower suspension rails pivotally attached to one another at a central pivot; first second and third suspension supports, each comprising a resilient element and a suspension strut, the suspension strut having an upper end pivotally connected to a frame of the vehicle and a lower end; and, wherein the lower end of the suspension strut of the first suspension support is pivotally connected to the first lower suspension rail, the lower end of the suspension strut of the third suspension support is pivotally connected to the second lower suspension rail and wherein the lower end of the suspension strut of the second suspension support is pivotally connected to the first lower suspension rail, the second lower suspension rail or the first and second lower suspension rails proximal the central pivot.

Each suspension support may further comprise an upper support bracket pivotally connected to an upper end of the resilient element and the upper end of the suspension strut. Each upper support bracket may be fixedly attached to its respective suspension strut and pivot with the suspension strut in a first direction. Gravity may urge the frame in a downward direction, causing the upper support bracket to rotate in the first direction and causing compression of the resilient element.

A four bar linkage may be formed for the first suspension support that comprises the suspension strut, the upper support bracket, the resilient element and the first lower suspension rail. A four bar linkage may be formed for the third suspension support that comprises the suspension strut, the upper support bracket, the resilient element and the second lower suspension rail. A four bar linkage may be formed for the second suspension support that comprises the suspension strut, the upper support bracket, the resilient element and the first lower suspension rail.

Each suspension support may further comprise a lower support bracket pivotally connected to a lower end of the resilient element and configured to connect the lower end of the resilient element to its respective lower suspension rail. The suspension strut may be pivotally connected to a top or bottom side of the respective lower suspension rail. The lower support bracket may be connected to an opposite side of the respective lower suspension rail as compared with the suspension strut. For example, the suspension strut may be pivotally connected to a top side of the respective lower suspension rail and the lower support bracket may then be connected to a lower side of the respective lower suspension rail.

The resilient element of the first suspension support may be pivotally connected to the bottom side of the first lower suspension rail by the lower support bracket and the suspension strut of the first suspension support may be pivotally connected to the top side of the first lower suspension rail. The resilient element of the third suspension support may be pivotally connected to the bottom side of the second lower suspension rail by the lower support bracket and the suspension strut of the third suspension support may be pivotally connected to the top side of the second lower suspension rail. The resilient element of the second suspension support may be pivotally connected to the bottom side of the first lower suspension rail by the lower support bracket and the suspension strut of the second suspension support is pivotally connected to the top side of the first and second lower suspension rails.

The lower end of each suspension strut may be pivotally connected to its respective lower suspension rail via a pivot structure comprising a pivot shaft having a pivot axis and a resilient annular bushing concentric with the pivot axis. Deflection of the pivot shaft from concentric alignment with the pivot axis may be resisted by the resilient annular bushing. The pivot structure may further comprise a pivot housing circumferentially disposed about the resilient annular bushing. The pivot structure may be located above its respective lower suspension rail.

The resilient element may comprise a gas filled shock, an oil filled shock, a spring, an elastomeric material or a combination thereof. The plurality of track idler wheels may comprise a plurality of sets of track idler wheels. The track drive wheel may comprise a set of track drive wheels. The first lower suspension rail may comprise a first outer lower suspension rail and a first inner lower suspension rail. The second lower suspension rail may comprise a second outer lower suspension rail and a second inner lower suspension rail.

A first quadrilateral may be formed between the first suspension support, first lower suspension rail, second suspension support and the vehicle frame. A second quadrilateral may be formed between the second suspension support, second lower suspension rail, third suspension support and the vehicle frame. The first and second quadrilaterals may be coupled together and may share the second suspension support in common.

An idler wheel assembly may comprise a set of the track idler wheels rotatably secured to a hub assembly. The hub assembly may comprise bearings and may be suspended beneath the first or second lower suspension rails. The track idler wheels and/or hub assembly may be removable from the track suspension of the vehicle while the track is on the track suspension of the vehicle.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Like elements are described with like reference numerals; thus, items shown on a particular drawing may be described in connection with another drawing containing the same reference numeral.

Figure 1:
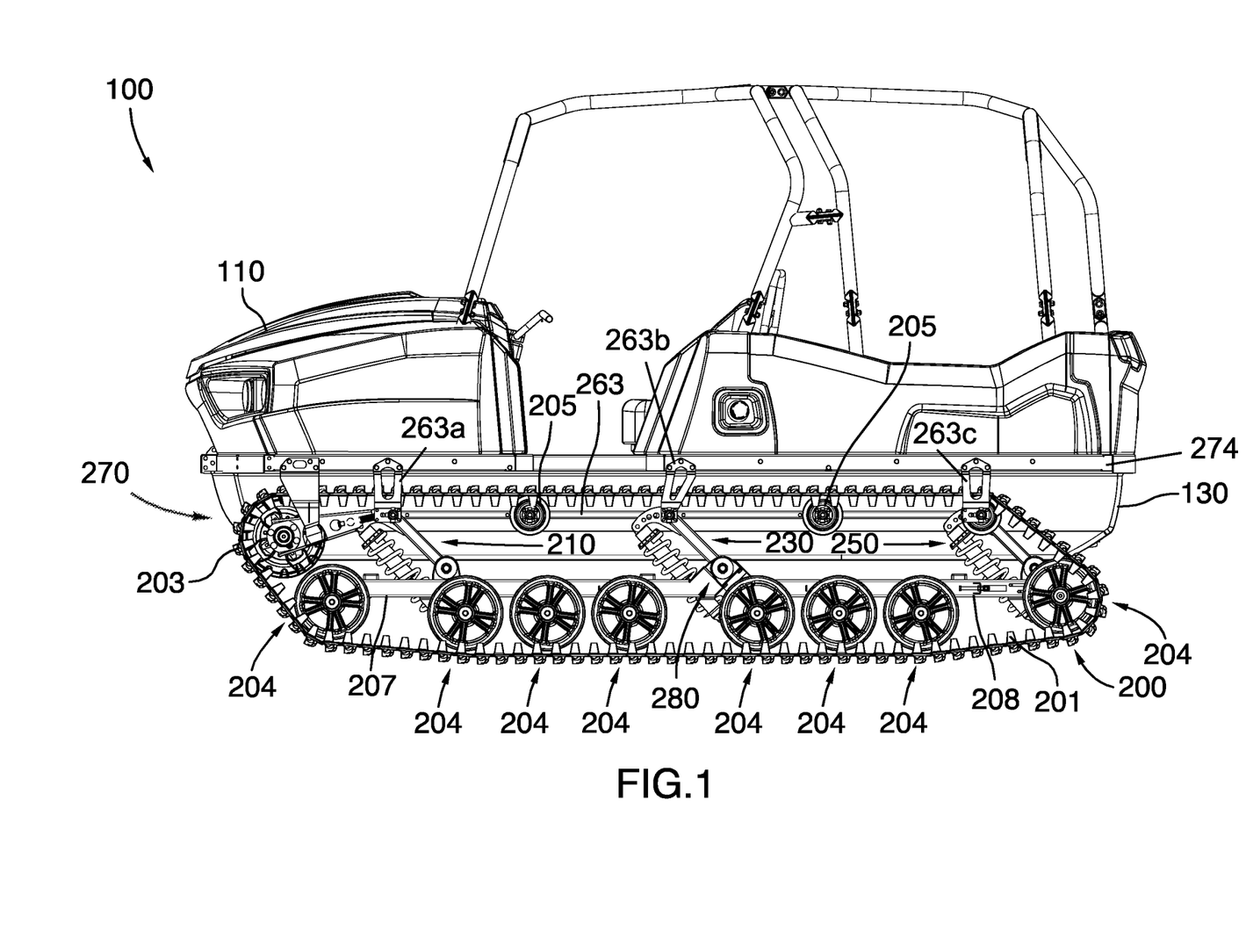
FIG. 1 is a side view of the all-terrain vehicle.
Figure 2:
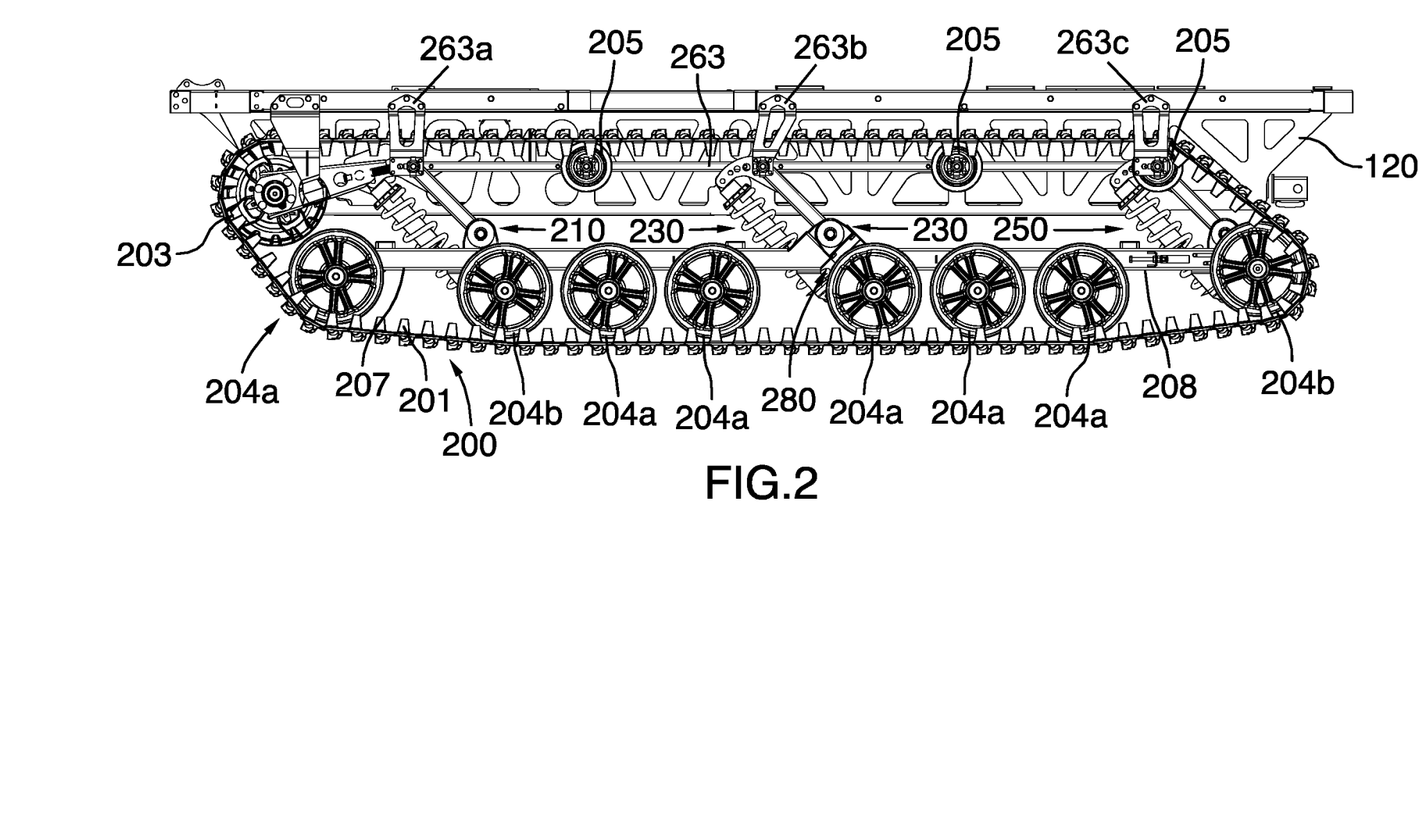
FIG. 2 is a side view of a track suspension of the vehicle of FIG. 1.

Referring to FIGS. 1 and 2, an all-terrain vehicle 100 comprises a vehicle body 110 mounted to a vehicle frame 120 (not shown in FIG. 1). A sealed enclosure 130 (not shown in FIG. 2) is mounted to the vehicle frame 120 beneath the vehicle body 110. The sealed enclosure 130 provides buoyancy to the vehicle 100 when travelling on water during amphibious operations.

An endless loop track 200 is provided for propelling the vehicle on land or water. The endless loop track 200 comprises inwardly projecting teeth, 201 and outwardly projecting lugs 202. One example of a suitable track is described in U.S. patent application Ser. No. 29/551,436 filed Jan. 13, 2016, which is incorporated herein by reference. A track drive assembly 270 comprising a set of track drive wheels 203, each in the form of a sprocket having indentations complementary to the inwardly projecting teeth 201, is rotatably mounted to the vehicle frame 120 through a sealed aperture in the enclosure 130 at a front of the vehicle 100, as is more thoroughly described with reference to FIGS. 10A-D. The engine (not shown) is preferably mounted in the front of the vehicle 100 proximal the track drive assembly 270.

A plurality of sets of track idler wheels 204 (each set comprising an exterior idler wheel 204a and an interior idler wheel 204b) and track support wheels 205 are provided and engaged with an interior surface of the endless loop track 200. The idler wheels 204 and support wheels 205 maintain tension as the track 200 is routed through a desired configuration. In the embodiment shown, the track 200 is routed in a parallelogram configuration whereby the track slopes downwardly and rearwardly at the front of the vehicle 100 and upwardly and forwardly at a rear of the vehicle 100.

The vehicle 100 further comprises a suspension for the track 200. Track idler wheels 204 are mounted to a bottom side 206a of a first lower suspension rail 207 and a bottom side 206b of a second lower suspension rail 208. The first lower suspension rail 207 has a top side 209a and the second lower suspension rail 208 has a top side 209b. The first lower suspension rail 207 and second lower suspension rail 208 are pivotally connected to one another at a central pivot, generally denoted as 280, in a manner that will be more thoroughly described hereinafter. Track support wheels 205 are rotatably mounted to the frame 120 via support shafts that have their free cantilevered ends connected to one another by an upper suspension rail 263. Suspension brackets 263a, 263b, 263c secure the upper suspension rail 263 to a transversely extending portion of the vehicle frame 274 to provide stability to the free ends of the support shafts, which are ultimately connected to the frame at both ends.

A first suspension support 210, a second suspension support 230 and a third suspension support 250 are also provided. Each of the first, second and third suspension supports 210, 230, 250 are pivotally connected to either the first or second lower suspension rails 207, 208 and the vehicle frame 120. This permits the track 200 to flex and the idler wheels 204 to move vertically relative to the vehicle frame 120 as the vehicle traverses rough terrain, thereby absorbing the jarring impact that would otherwise be transmitted to occupants of the vehicle 100.

Figure 3:
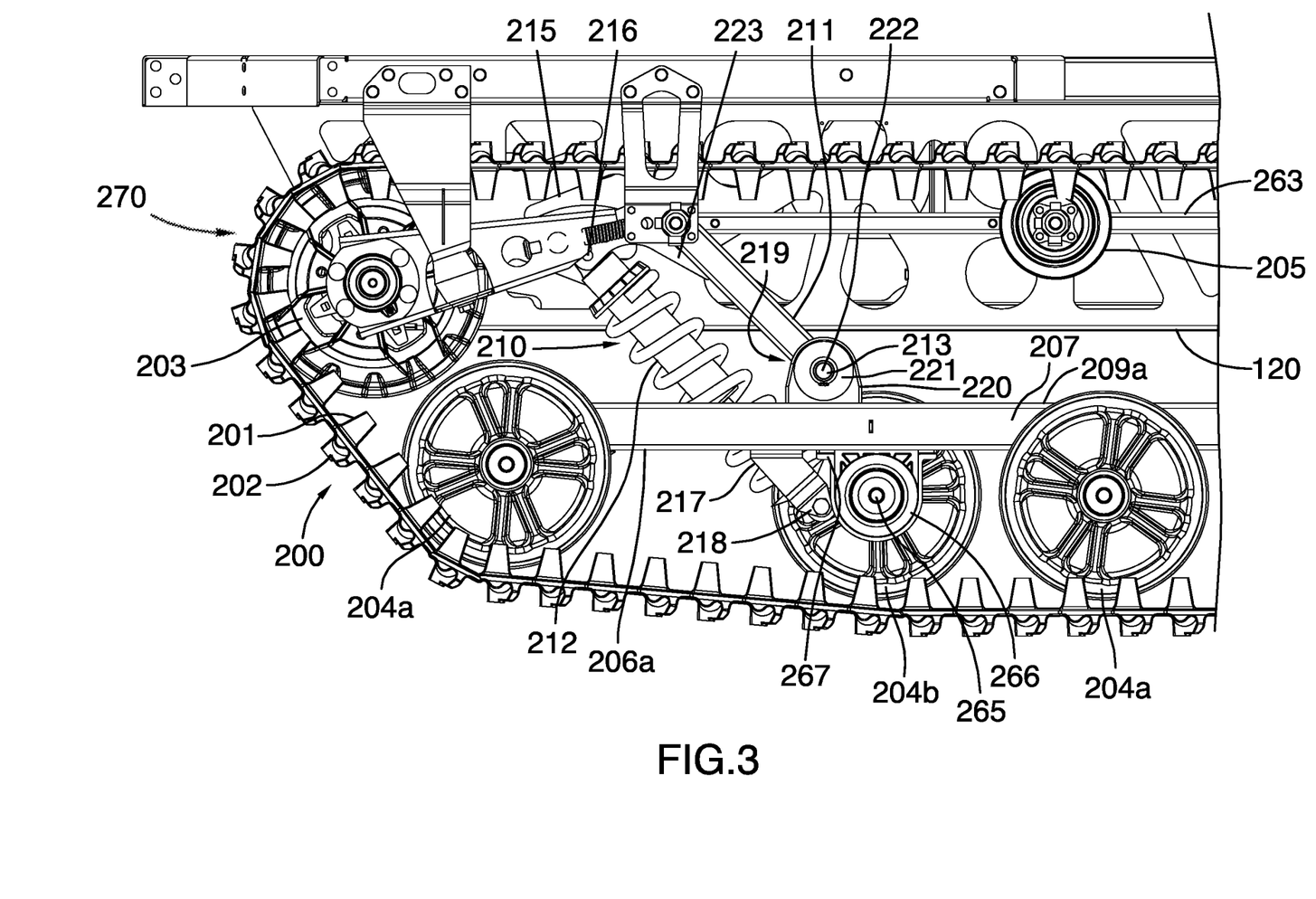
FIG. 3 is a side view of a front portion of the track suspension of FIG. 2.

Referring to FIG. 3, the first suspension support 210 comprises a first suspension strut 211 and a first resilient element 212. A lower end of the first suspension strut 211 is pivotally attached to the first lower suspension rail 207 via a first lower pivot shaft 213. An upper end of the first suspension strut 211 is pivotally attached to the vehicle frame 120 via a first upper pivot shaft 214. A first upper support bracket 215 is pivotally connected at one end to the upper end of the first suspension strut 211 via the first upper pivot shaft 214. The other end of the first upper support bracket 215 is pivotally connected to an upper end of the first resilient element 212 at a first upper bracket pivot 216. A lower end of the first resilient element 212 is pivotally attached to a first lower support bracket 217 at a first lower bracket pivot 218. The first lower support bracket 217 is attached to the bottom side 206a of the first lower suspension rail 207.

A first pivot structure 219 is located on a top side 209a of the first lower suspension rail 207. The first pivot structure 219 comprises a first housing 220 within which is captured a first resilient annular bushing 221, which in turn secures the first lower pivot shaft 213. The first lower pivot shaft 213, first resilient annular bushing 221, and first housing 220, are all normally concentrically aligned with a first pivot axis 222. The first suspension strut 211 is able to freely rotate about the first lower pivot shaft 213, which is in fixed rotational relationship relative to the first lower suspension rail 207 by virtue of being secured within the first resilient annular bushing 221. The first pivot shaft 213 is permitted to temporarily deflect from concentric alignment with the first pivot axis 222 in response to rough terrain encountered by the tracks 200 when the vehicle is in motion. This temporary deflection is resisted by the first resilient annular bushing 221. This allows for a degree of transverse angular movement of the track 200 and idler wheels 204, for example due to encountering an obstacle at the periphery of the track rather than in the center of the track. It also permits enhanced vibration dampening as compared with a rigid pivot connection, especially during high speed operation of the vehicle 100. The first resilient annular bushing 221 is of a size sufficient to permit dampening to occur over a typical range of motion. In the embodiment shown, the thickness of the annulus of the first resilient annular bushing 221 is from about 1-3 times the diameter of the first lower pivot shaft 213.

The first upper support bracket 215 comprises a first downwardly extending portion 223 that is attached to the first suspension strut 211. The first upper support bracket 215 and first suspension strut 211 thus maintain a fixed relationship with one another. The first upper support bracket 215 and first suspension strut 211 could thus be formed from a single unitary piece. The influence of gravity on the vehicle frame 120 urges the first suspension strut 211 and first upper support bracket 215 to rotate in a first direction (counterclockwise in the left side view of the vehicle shown) about the first upper pivot shaft 214. This in turn causes compression of the first resilient element 212, which resiliently resists the rotation in the first direction. By adjusting the resiliency of the first resilient element 212, a desired degree of pre-compression of the first suspension support 210 can be achieved. Thus, the vehicle frame 120 is resiliently supported by the four bar linkage created between the first upper pivot shaft 214, the first upper bracket pivot 216, the first lower bracket pivot 218, and the first lower pivot shaft 213. The four bar linkage therefore comprises the first suspension strut 211, the first upper support bracket 215, the first resilient element 212, and the first lower suspension rail 207, which connects the first lower support bracket 217 and the first pivot structure 219.

Figure 4:
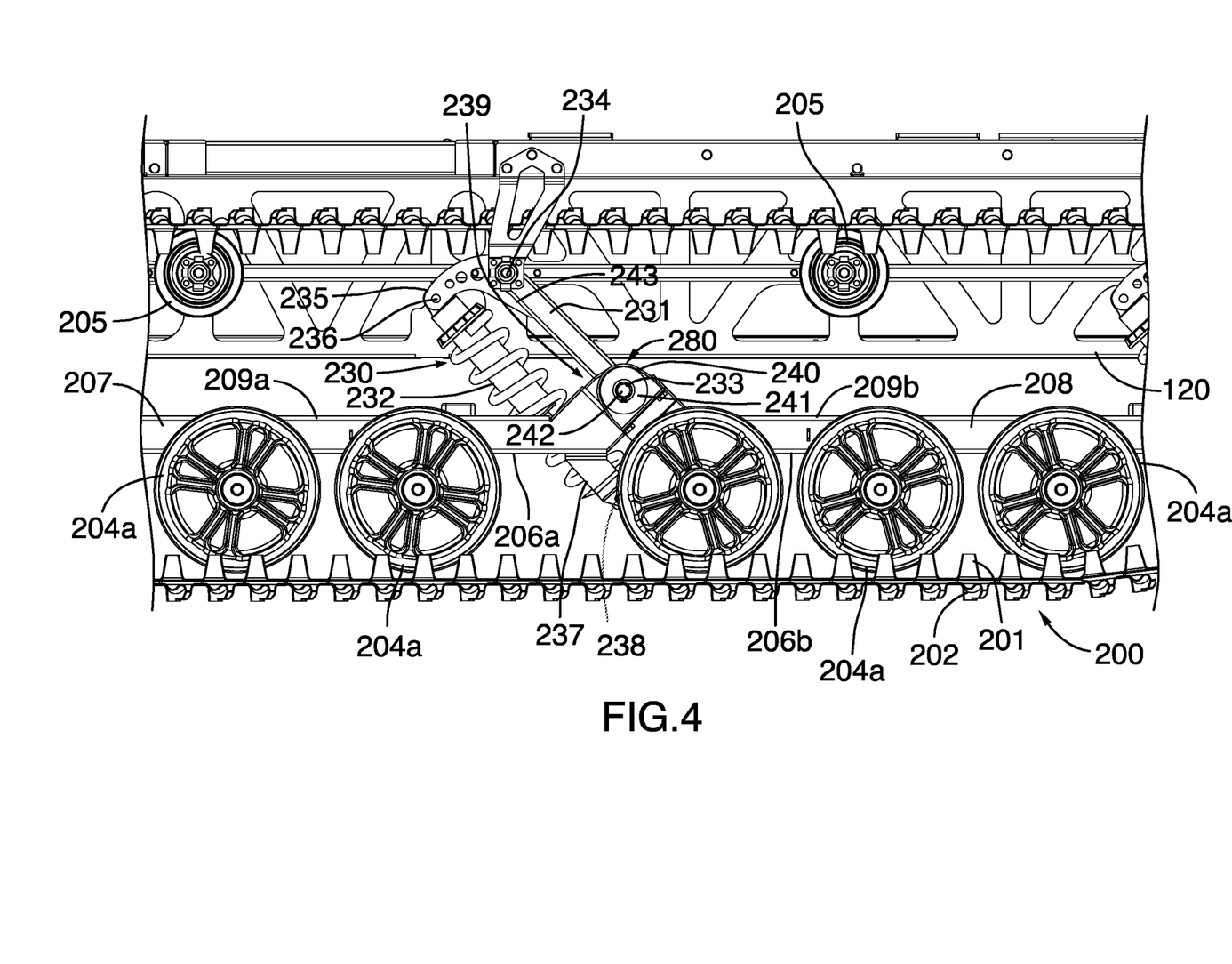
FIG. 4 is a side view of a middle portion of the track suspension of FIG. 2.

Referring to FIG. 4, the second suspension support 230 comprises a second suspension strut 231 and a second resilient element 232. A lower end of the second suspension strut 231 is pivotally attached to the first lower suspension rail 207 and the second lower suspension rail 208 via a second lower pivot shaft 233. In the embodiment shown, the second lower pivot shaft 233 is co-located with the central pivot 280, although this need not always be the case provided that the second lower pivot shaft 233 is proximal the central pivot 280. An upper end of the second suspension strut 231 is pivotally attached to the vehicle frame 120 via a second upper pivot shaft 234. A second upper support bracket 235 is pivotally connected at one end to the upper end of the second suspension strut 231 via the second upper pivot shaft 234. The other end of the second upper support bracket 235 is pivotally connected to an upper end of the second resilient element 232 at a second upper bracket pivot 236. A lower end of the second resilient element 232 is pivotally attached to a second lower support bracket 237 at a second lower bracket pivot 238. The second lower support bracket 237 is attached to the bottom side 206a of the first lower suspension rail 207.

Figure 6:
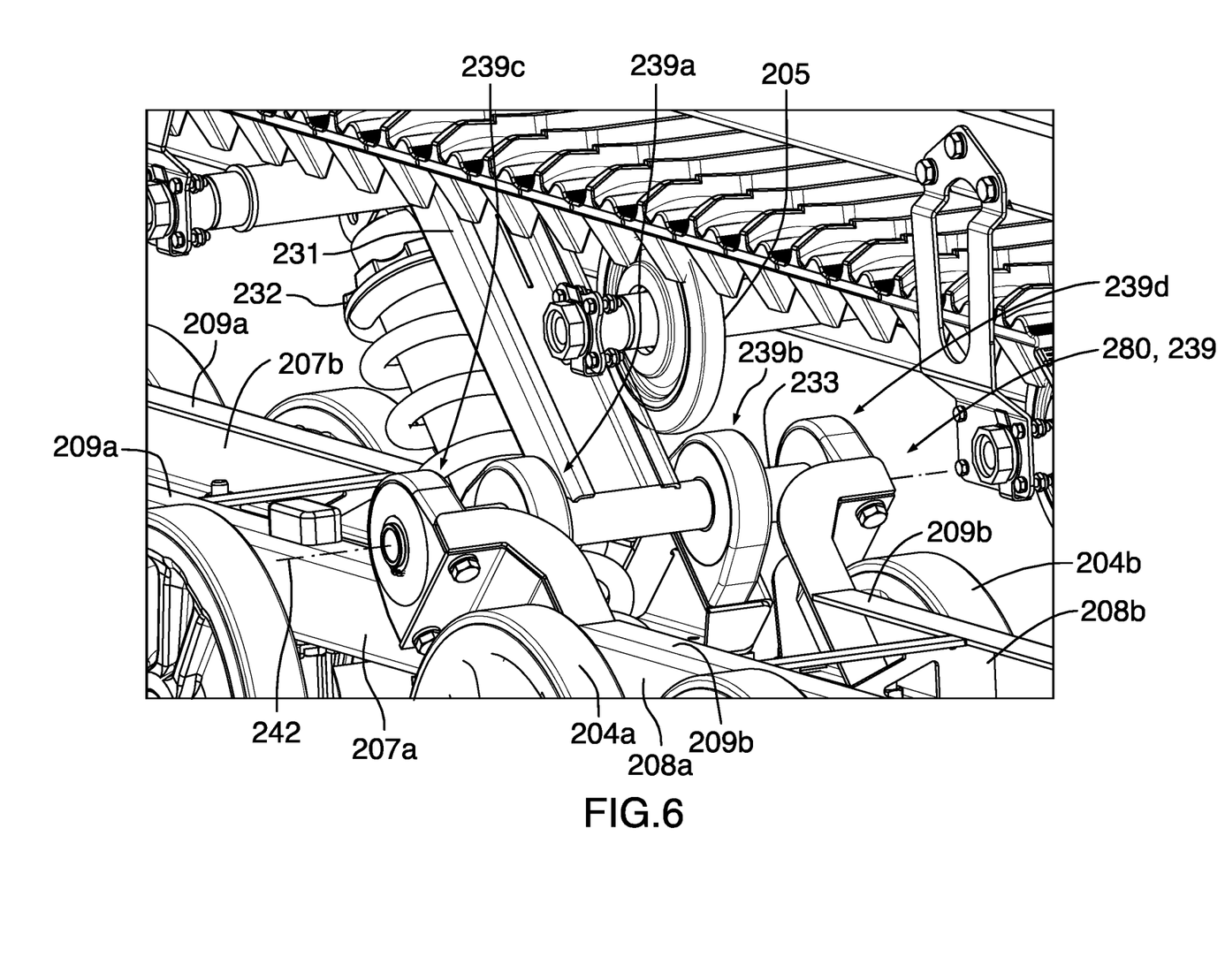
FIG. 6 is a rear perspective view of a middle portion of the track suspension of FIG. 2.

A second pivot structure 239 is located on the top side 209a of the first lower suspension rail 207 and the top side 209b of the second lower suspension rail 208, thereby connecting the two rails by means of the second lower pivot shaft 213. The second pivot structure 239 will be further described with reference to FIGS. 6 and 7. The central pivot 280 is co-located with second pivot structure 239, which comprises inner second pivot structures 239a, 239b and outer second pivot structures 239c, 239d connected with one another by a common second lower pivot shaft 233. The inner second pivot structures 239a, 239b are attached to the top side 209a of the first lower suspension rail 207. The outer second pivot structures 239c, 239d are attached to the top side 209b of the second lower suspension rail 208. In this manner, the first and second lower suspension rails 207, 208 are pivotally connected to one another. The second suspension strut 231 is located between the inner second pivot structures 239a, 239b. The first lower suspension rail 207 comprises a first outer lower suspension rail portion 207a and a first inner lower suspension rail portion 207b. The second lower suspension rail 208 comprises a second outer lower suspension rail portion 208a and a second lower inner suspension rail portion 208b. The second resilient element 232 extends between the inner and outer portions 207a, 207b of the first lower suspension rail 207. Since the second lower bracket pivot 238 is beneath the first lower suspension rail 207, the second resilient element 232 pivots between the inner and outer portions 207a, 207b of the first lower suspension rail 207. The second suspension support 230 is thus nested between the inner and outer portions 207a, 207b of the first lower suspension rail 207 and operates at least partially below the first lower suspension rail 207. The first suspension support 210 is similarly nested between the inner and outer portions 207a, 207b of the first lower suspension rail 207 and the third suspension support 250 is similarly nested between the inner and outer portions 208a, 208b of the second lower suspension rail 208, allowing them to also operate at least partially below their respective suspension rails. This arrangement advantageously reduces the overall height of the vehicle 100.

Returning to FIG. 4, the second pivot structure 239 comprises a second housing 240 within which is captured a second resilient annular bushing 241, which in turn secures the second lower pivot shaft 233. The second lower pivot shaft 233, second resilient annular bushing 241, and second housing 240, are all normally concentrically aligned with a second pivot axis 242 (see FIGS. 6 and 7). The second suspension strut 231 is able to freely rotate about the second lower pivot shaft 233, which is in fixed rotational relationship relative to both the first lower suspension rail 207 and second lower suspension rail 208 by virtue of being secured within the second resilient annular bushing 241. The second pivot shaft 233 is permitted to temporarily deflect from concentric alignment with the second pivot axis 242 (see FIGS. 6 and 7) in response to rough terrain encountered by the tracks 200 when the vehicle is in motion. This temporary deflection is resisted by the second resilient annular bushing 241. This allows for a degree of transverse angular movement of the track 200 and idler wheels 204, for example due to encountering an obstacle at the periphery of the track rather than in the center of the track. It also permits enhanced vibration dampening as compared with a rigid pivot connection, especially during high speed operation of the vehicle 100. The second resilient annular bushing 241 is of a size sufficient to permit dampening to occur over a typical range of motion. In the embodiment shown, the thickness of the annulus of the second resilient annular bushing 241 is from about 1-3 times the diameter of the second lower pivot shaft 233.

The second upper support bracket 235 comprises a second downwardly extending portion 243 that is attached to the second suspension strut 231. The second upper support bracket 235 and second suspension strut 231 thus maintain a fixed relationship with one another. Persons of skill in the art will understand that the second upper support bracket 235 and second suspension strut 231 could thus be formed from a single unitary piece. The influence of gravity on the vehicle frame 120 urges the second suspension strut 231 and second upper support bracket 235 to rotate in a first direction (counterclockwise in the left side view of the vehicle shown) about the second upper pivot shaft 234. This in turn causes compression of the second resilient element 232, which resiliently resists the rotation in the first direction. By adjusting the resiliency of the resilient element 232, a desired degree of pre-compression of the second suspension support 230 can be achieved. Thus, the vehicle frame 120 is resiliently supported by the four bar linkage created between the second upper pivot shaft 234, the second upper bracket pivot 236, the second lower bracket pivot 238, and the second lower pivot shaft 233. The four bar linkage therefore comprises the second suspension strut 231, the second upper support bracket 235, the second resilient element 232, and the first lower suspension rail 207, which connects the second lower support bracket 237 and the second pivot structure 239.

Figure 5:
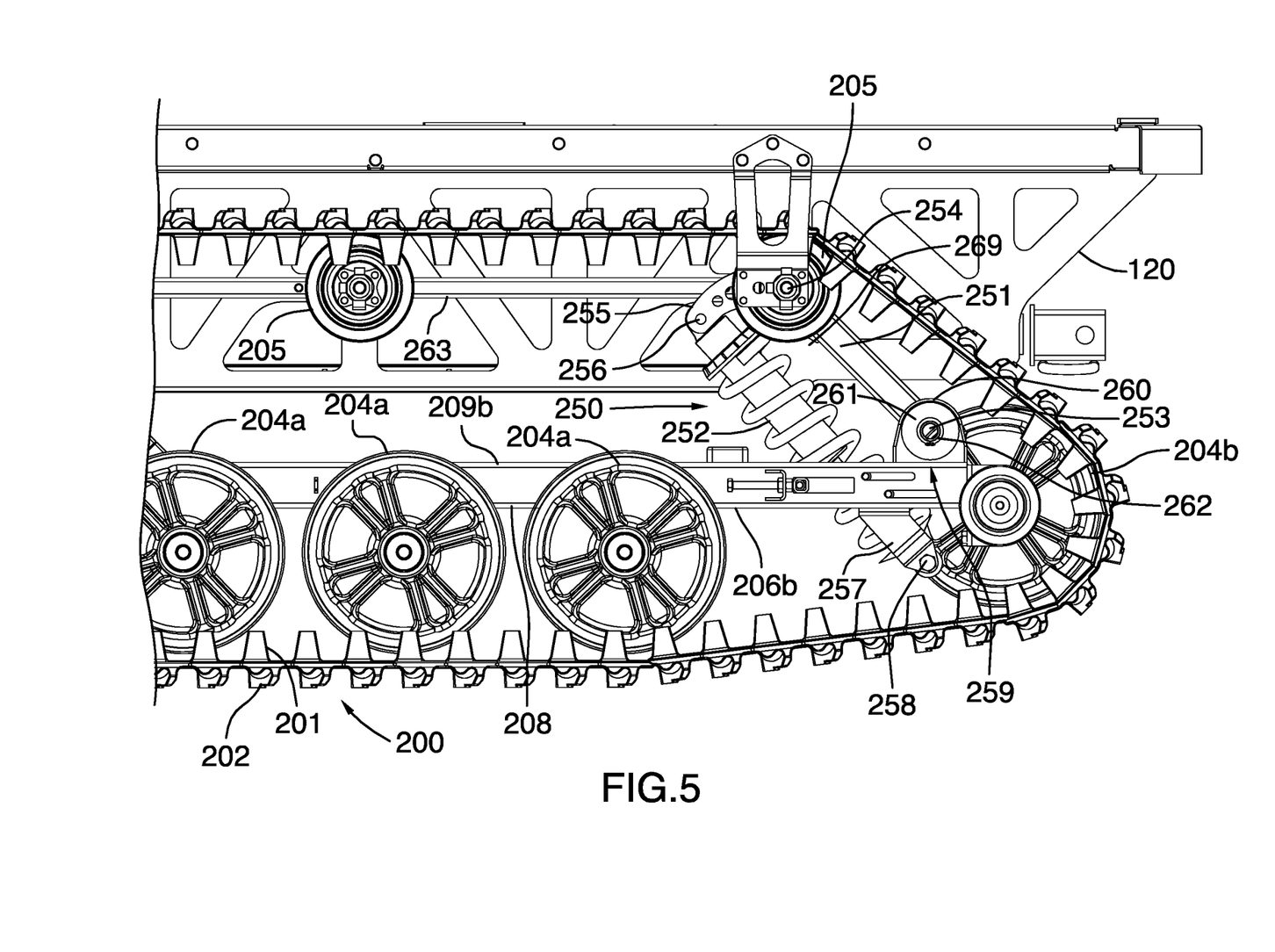
FIG. 5 is a side view of a rear portion of the track suspension of FIG. 2.

Referring to FIG. 5, the third suspension support 250 comprises a third suspension strut 251 and a third resilient element 252. A lower end of the third suspension strut 251 is pivotally attached to the second lower suspension rail 208 via a third lower pivot shaft 253. An upper end of the third suspension strut 251 is pivotally attached to the vehicle frame 120 via a third upper pivot shaft 254. A third upper support bracket 255 is pivotally connected at one end to the upper end of the third suspension strut 251 via the third upper pivot shaft 254. The other end of the third upper support bracket 255 is pivotally connected to an upper end of the third resilient element 252 at a third upper bracket pivot 256. A lower end of the third resilient element 252 is pivotally attached to a third lower support bracket 257 at a third lower bracket pivot 258. The third lower support bracket 257 is attached to the bottom side 206b of the second lower suspension rail 208.

A third pivot structure 259 is located on a top side 209b of the second lower suspension rail 208. The third pivot structure 259 comprises a third housing 260 within which is captured a third resilient annular bushing 261, which in turn secures the third lower pivot shaft 253. The third lower pivot shaft 253, third resilient annular bushing 261, and third housing 260, are all normally concentrically aligned with a third pivot axis 262. The third suspension strut 251 is able to freely rotate about the third lower pivot shaft 253, which is in fixed rotational relationship relative to the second lower suspension rail 208 by virtue of being secured within the third resilient annular bushing 261. The third pivot shaft 253 is permitted to temporarily deflect from concentric alignment with the third pivot axis 262 in response to rough terrain encountered by the tracks 200 when the vehicle is in motion. This temporary deflection is resisted by the third resilient annular bushing 261. This allows for a degree of transverse angular movement of the track 200 and idler wheels 204, for example due to encountering an obstacle at the periphery of the track rather than in the center of the track. It also permits enhanced vibration dampening as compared with a rigid pivot connection, especially during high speed operation of the vehicle 100. The third resilient annular bushing 261 is of a size sufficient to permit dampening to occur over a typical range of motion. In the embodiment shown, the thickness of the annulus of the third resilient annular bushing 261 is from about 1-3 times the diameter of the third lower pivot shaft 253.

The third upper support bracket 255 comprises a third downwardly extending portion 269 that is attached to the third suspension strut 251. The third upper support bracket 255 and third suspension strut 251 thus maintain a fixed relationship with one another. Persons of skill in the art will understand that the third upper support bracket 255 and third suspension strut 251 could thus be formed from a single unitary piece. The influence of gravity on the vehicle frame 120 urges the third suspension strut 251 and third upper support bracket 255 to rotate in a first direction (counterclockwise in the left side view of the vehicle shown) about the third upper pivot shaft 254. This in turn causes compression of the third resilient element 252, which resiliently resists the rotation in the first direction. By adjusting the resiliency of the resilient element 252, a desired degree of pre-compression of the third suspension support 250 can be achieved. Thus, the vehicle frame 120 is resiliently supported by the four bar linkage created between the third upper pivot shaft 254, the third upper bracket pivot 256, the third lower bracket pivot 258, and the third lower pivot shaft 253. The four bar linkage therefore comprises the third suspension strut 251, the third upper support bracket 255, the third resilient element 252, and the second lower suspension rail 208, which connects the third lower support bracket 257 and the third pivot structure 259.

Returning to FIG. 2, it can be seen that the suspension comprises a first quadrilateral formed between the first suspension support 210, first lower suspension rail 207, second suspension support 230 and vehicle frame 120, coupled with a second quadrilateral formed between the second suspension support 230, second lower suspension rail 208, third suspension support 250 and vehicle frame 120. The first and second quadrilaterals share the second suspension support 230 in common and are thus coupled to one another. Upward deflection of the first lower suspension rail 207 thus causes some upward deflection of the second lower suspension rail 208, but to a lesser degree than if these two rails were integrally formed as a single rail. This allows the idler wheels 204 connected to the second lower suspension rail 208 to remain in relatively greater contact with the ground through track 200 when an obstacle is encountered by the front of the vehicle. By providing a configuration for the track 200 that slopes downwardly and rearwardly at the front of the vehicle 100, an obstacle can be readily ascended by the track 200 and the vehicle 100 can be propelled over the obstacle through the greater ground traction provided by this suspension configuration.

The idler wheels at the front and at the rear of the vehicle 100 are slightly elevated relative to the remaining idler wheels 204. This further improves the ability of the vehicle 100 to overcome an obstacle at the front and, at the rear, ensures greater ground contact when the front of the vehicle 100 is pitched upwardly. A related effect is that the pressure exerted by the track 200 on the ground is greatest in the center of the track and reduced at the front and rear. This makes the vehicle relatively easier to turn than if all idler wheels 204 were provided at the same elevation. By decreasing the resilience of the second resilient element 232 (i.e. increasing the stiffness) relative to the first resilient element 212 and third resilient element 252, steering performance can be further improved by increasing the proportion of the weight of vehicle 1000 applied to the center of the track 200 relative to the front and rear ends of the vehicle.

Figure 7:
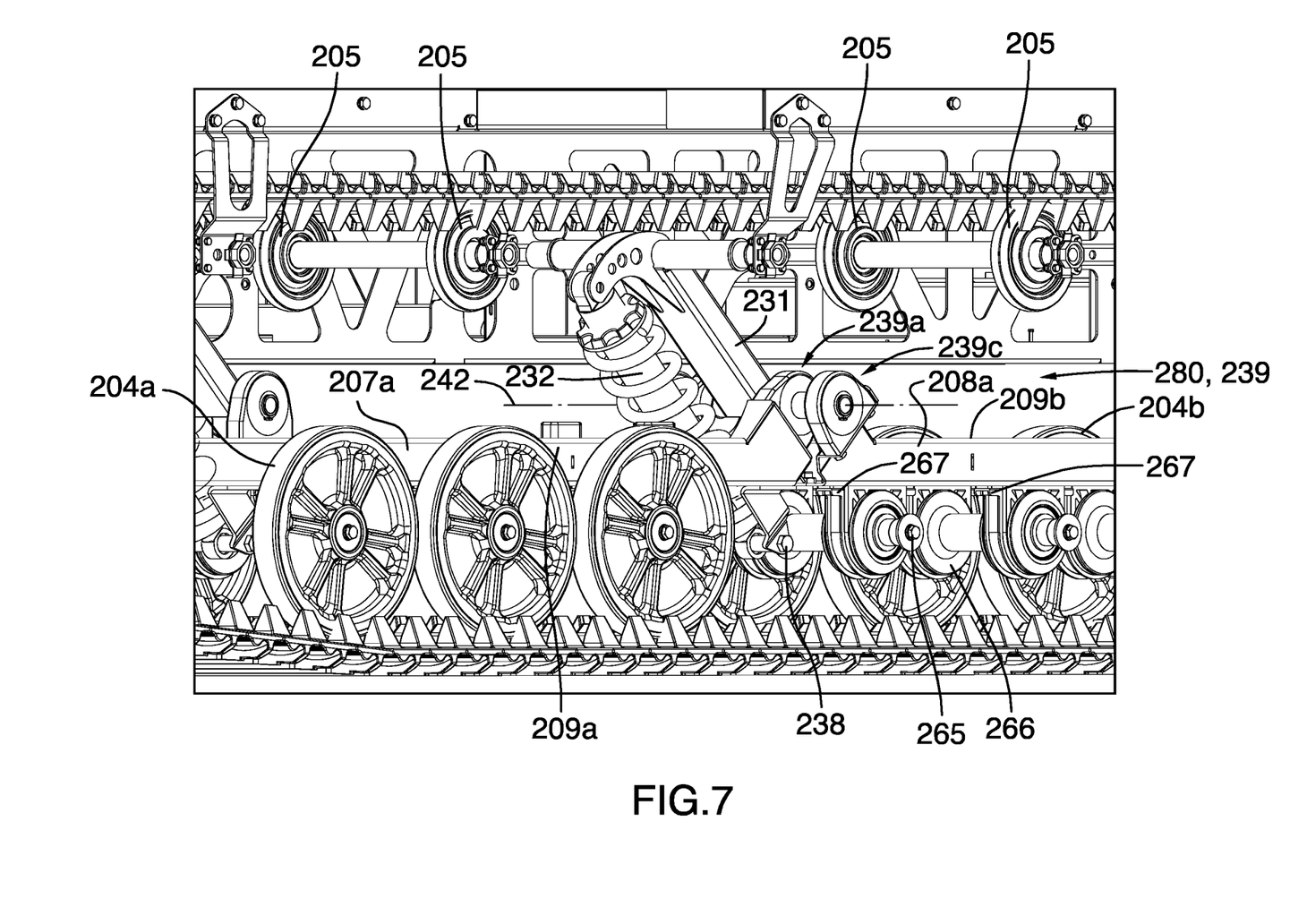
FIG. 7 is a front perspective view of a middle portion of the track suspension of FIG. 2.
Figure 8:
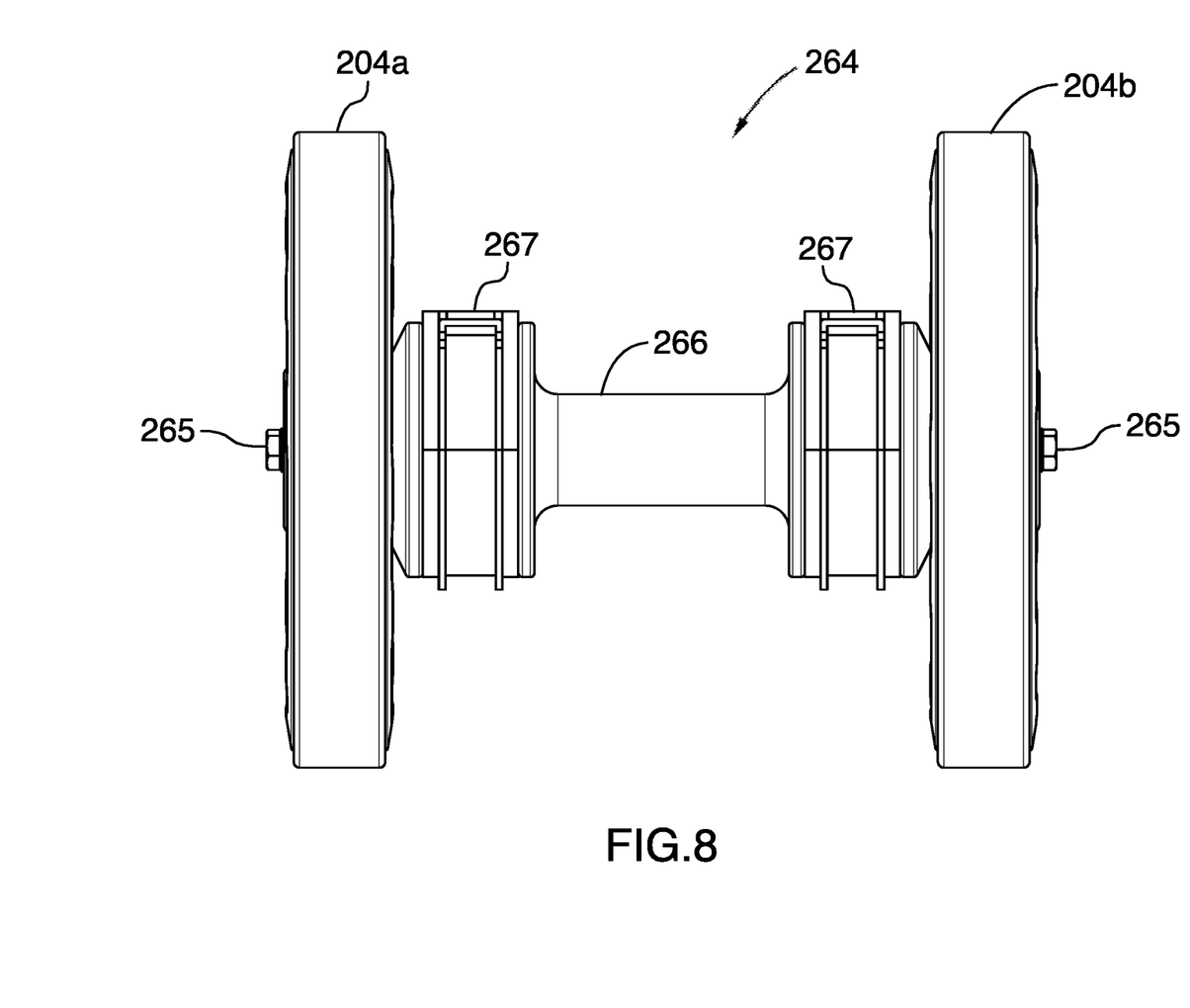
FIG. 8 is a rear view of an idler wheel assembly.

Referring to FIGS. 3, 7 and 8, a track idler wheel assembly 264 comprises a set of idler wheels 204a, 204b. A single wheel bolt 265 is used to secure the wheels 204a, 204b to an aluminum hub assembly 266. The hub assembly 266 is configured to be suspended from saddles 267 that are bolted to the bottom side 206a, 206b of the first and second lower suspension rails 207, 208. Each idler wheel assembly 264 is thus independently suspended from the first and lower suspension rails 207, 208. Each saddle 267 optionally includes a resilient bushing (not shown) to allow some dampened movement between the hub assembly 266 and the saddle 267, so that the idler wheel assembly 264 is resiliently suspended from the first and second lower suspension rails 207, 208. The hub assembly 266 includes a bearing for each wheel 204a, 204b that is optionally oil lubricated, which is especially useful in cold climates. A damaged idler wheel 204a, 204b is readily removable from the hub assembly 266 for replacement by removing its respective wheel bolt 265. The wheel 204a, 204b can be lifted out of engagement with the inside surface of the track 200. Once both wheels 204a, 204b are removed, a damaged hub assembly 266 can be readily replaced by removing the saddles 267 and sliding the hub assembly 266 laterally out from beneath the first or second lower suspension rail 207, 208 from which it is suspended. This permits easy field maintenance of the idler wheels 204a, 204b and hub assembly 266 in the field, while the track 200 is on the track suspension of the vehicle 100 without the need to remove the track 200 or even jack the vehicle 100.

Figure 9:
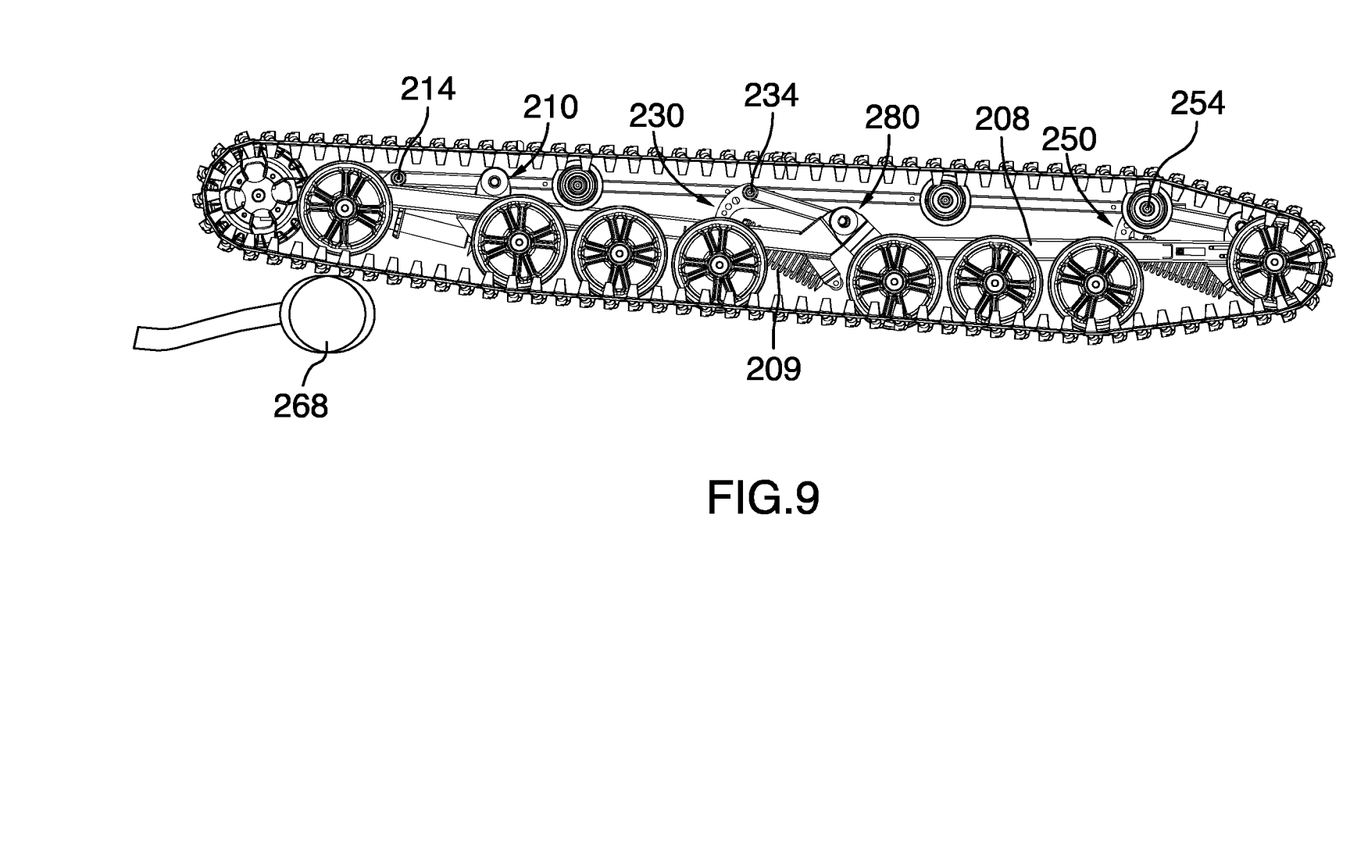
FIG. 9 is a side view of the track in a first position, when initially encountering an obstacle.

Referring to FIG. 9, the track suspension is shown traversing an obstacle 268. The obstacle 268 causes the front idler wheel 204 to move upwardly. This in turn causes the first lower suspension rail 207 to move upwardly, causing upward movement of the first and second lower pivot shafts 213, 233, which is resisted by the first and second suspension supports 210, 230. The first and second suspension supports 210, 230 are caused to pivot about first and second upper pivot shafts 214, 234. Upward movement of the second lower pivot shaft 233 also causes the second lower suspension rail 208 to move upwardly, which is resisted by the third suspension support 250. Thus, all of the first, second and third suspension supports 210, 230, 250 are engaged when the obstacle 268 is encountered. The suspension absorbs the energy of impact with the obstacle 268 by flattening somewhat due to the pivoting movement of the suspension supports 210, 230, 250. The first lower suspension rail 207 deflects upwardly to a greater degree than the second lower suspension rail 208 when the obstacle is first encountered; this behavior is reduced as the obstacle is traversed by the vehicle 100.

Figure 10A:
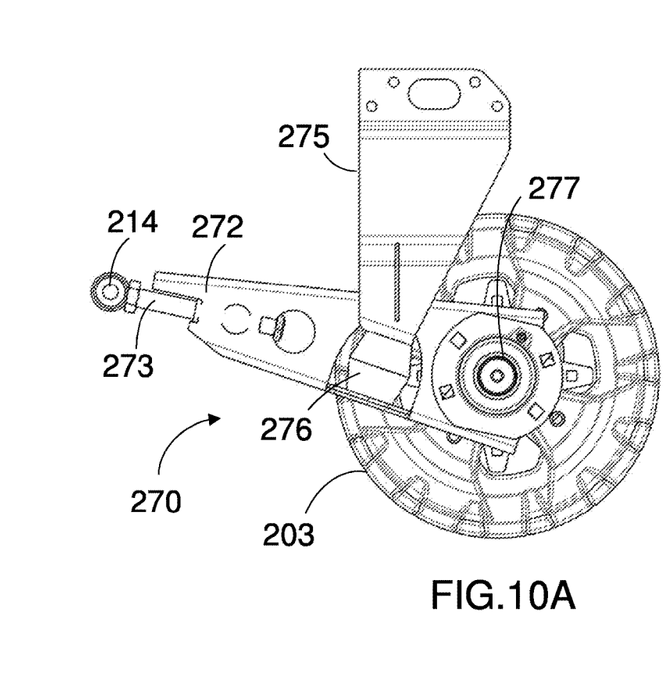
FIG. 10A is a side view of a track drive assembly.
Figure 10B:
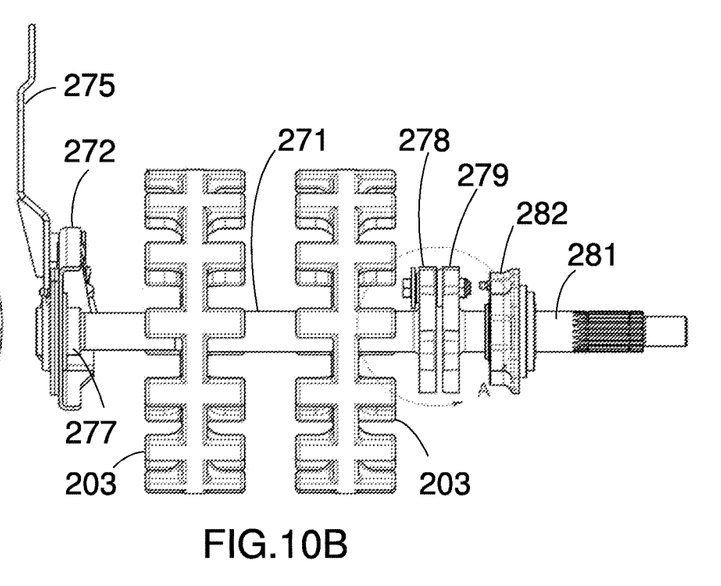
FIG. 10B is an end view of the track drive assembly of FIG. 10A.

Referring to FIGS. 10A-10B, a track drive assembly 270 comprises a pair of track drive wheels 203. The track drive wheels 203 may be made from any suitable material, but in the embodiment shown are made from a thermoset elastomeric material. This advantageously reduces noise caused by operation of the drive wheels 203 and also advantageously reduces wear between the track 200 (not shown) and the drive wheels 203, as compared with other materials. The track drive wheels 203 are mounted to a track drive shaft portion 271 which is rotationally supported at one end by a bearing 277 mounted to a first drive shaft bracket 272 that is resiliently pivotally attached to the first upper pivot shaft 214 by way of an axially biased adjustable compression spring 273. The first drive shaft bracket 272 is resiliently suspended from the transversely extending portion of the vehicle frame 274 (not shown) by second drive shaft bracket 275, which is attached to the first drive shaft bracket 272 via elastomeric block 276. The track drive shaft portion 271 comprises a flange 278 at the end opposite the bearing 277 for connection to a flange 279 of a transmission drive shaft portion 281. The transmission drive shaft portion 281 passes through the sealed enclosure 130 (not shown) via a bearing mounted within a water-tight housing 282. This prevents water ingress to the sealed enclosure 130 during amphibious operation of the vehicle 100.

Figure 10C:
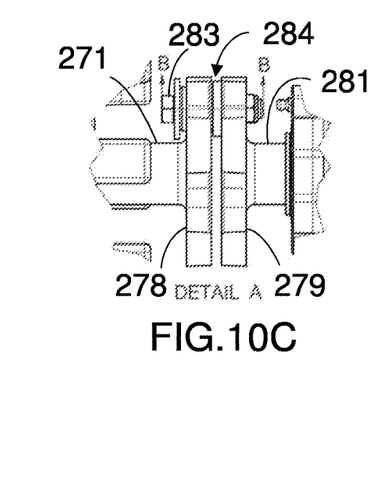
FIG. 10C is a detailed view of a portion of FIG. 10B.
Figure 10D:
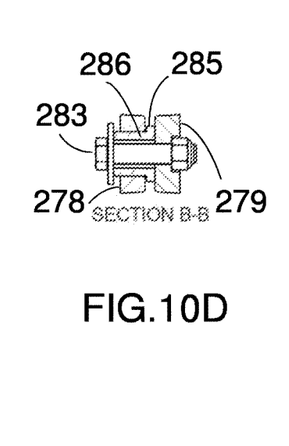
FIG. 10D is a cross-sectional view of a portion of FIG. 10C.

The flanged connection of the track drive shaft portion 271 and transmission drive shaft portion 281 are shown in greater detail in FIG. 10C as Detail A. The flanges 278, 279 are connected to one another by a plurality of flange bolts 283 (only one shown) that are each mounted within a resilient elastomeric flange bolt bushing 284. The flange bolt bushing 284 is shown in greater detail in FIG. 10D, which illustrates a cross-section B-B through the flange bolt 283. The flange bolt bushing 284 comprises a flanged portion 285 that separates the flanges 278, 279 and an elongated portion 286 that co-axially receives the flange bolt 283. The track drive shaft portion 271 is thus permitted to axially deflect relative to the transmission drive shaft portion 281 upon impact with obstacles through the combined action of the flange bolt bushing 284, the compression spring 273 and the elastomeric block 276, which advantageously permit a degree of resilient movement. This protects the transmission drive shaft portion 281 from damage and advantageously permits it to remain in a fixed water-tight relationship with the sealed enclosure 130.

The novel features will become apparent to those of skill in the art upon examination of the description. Inventive combinations of any one disclosed feature with another disclosed feature are intended to be claimed by the inventors. It should be understood, however, that the scope of the claims should not be limited by the embodiments, but should be given the broadest interpretation consistent with the wording of the claims and the specification as a whole.

The invention claimed is:

1. An all-terrain vehicle configured to be propelled by an endless loop track, the vehicle comprising:
   a vehicle frame;
   a track drive wheel rotatably attached to the frame and engaged with an inside surface of the track;
   a plurality of track idler wheels engaged with an inside surface of the track and rotatably connected to first and second lower suspension rails pivotally attached to one another at a central pivot;
   first, second and third suspension supports, each comprising a resilient element and a suspension strut, the suspension strut having an upper end pivotally connected to the frame and a lower end; and,
   wherein the lower end of the suspension strut of the first suspension support is pivotally connected to the first lower suspension rail, the lower end of the suspension strut of the third suspension support is pivotally connected to the second lower suspension rail and wherein the lower end of the suspension strut of the second suspension support is pivotally connected to the first lower suspension rail, the second lower suspension rail or the first and second lower suspension rails proximal the central pivot.

2. The vehicle of claim 1, wherein the lower end of the suspension strut of the second suspension support is pivotally connected to the first and second lower suspension rails at the central pivot.

3. The vehicle of claim 1, wherein each suspension support further comprises an upper support bracket pivotally connected to an upper end of the resilient element and the upper end of the suspension strut.

4. The vehicle of claim 3, wherein:
a four bar linkage is formed for the first suspension support that comprises the suspension strut, the upper support bracket, the resilient element and the first lower suspension rail;
a four bar linkage is formed for the second suspension support that comprises the suspension strut, the upper support bracket, the resilient element and the first lower suspension rail; and,
a four bar linkage is formed for the third suspension support that comprises the suspension strut, the upper support bracket, the resilient element and the second lower suspension rail.

5. The vehicle of claim 3, wherein each upper support bracket is fixedly attached to its respective suspension strut and pivots with the suspension strut in a first direction, and the resilient element is compressed by rotation of the upper support bracket in the first direction while the vehicle is at rest.

6. The vehicle of claim 1, wherein each suspension support further comprises a lower support bracket pivotally connected to a lower end of the resilient element and configured to connect the lower end of the resilient element to its respective lower suspension rail, wherein the suspension strut is pivotally connected to a top or bottom side of the respective lower suspension rail and wherein the lower support bracket is connected to an opposite side of the respective lower suspension rail as compared with the suspension strut.

7. The vehicle of claim 6, wherein:
the resilient element of the first suspension support is pivotally connected to the bottom side of the first lower suspension rail by the lower support bracket and the suspension strut of the first suspension support is pivotally connected to the top side of the first lower suspension rail;
the resilient element of the second suspension support is pivotally connected to the bottom side of the first lower suspension rail by the lower support bracket and the suspension strut of the second suspension support is pivotally connected to the top side of the first and second lower suspension rails; and
the resilient element of the third suspension support is pivotally connected to the bottom side of the second lower suspension rail by the lower support bracket and the suspension strut of the third suspension support is pivotally connected to the top side of the second lower suspension rail.

8. The vehicle of claim 1, wherein the lower end of each suspension strut is pivotally connected to its respective lower suspension rail via a pivot structure comprising a pivot shaft having a pivot axis and a resilient annular bushing concentric with the pivot axis, wherein deflection of the pivot shaft from concentric alignment with the pivot axis, is resisted by the resilient annular bushing, and wherein the pivot structure further comprises a pivot housing circumferentially disposed about the resilient annular bushing and wherein the pivot structure is located above its respective lower suspension rail.

9. The vehicle of claim 1, wherein the plurality of track idler wheels comprises pairs of idler wheels connected to one another to form an idler wheel assembly and wherein each idler wheel assembly is independently suspended from a bottom side of the first or second lower suspension rail.

10. The vehicle of claim 9, wherein each idler wheel assembly is independently resiliently suspended from the bottom side of the first or second lower suspension rail, and one of the pair of idler wheels is removable from its respective idler wheel assembly while the idler wheel assembly is suspended from the bottom side of the first or second lower suspension rail and while the other idler wheel remains engaged with the track.

11. A suspension for an all-terrain vehicle configured to be propelled by an endless loop track, the suspension comprising:
first and second lower suspension rails pivotally attached to one another at a central pivot;
first, second and third suspension supports, each comprising a resilient element and a suspension strut, the suspension strut having an upper end pivotally connected to a frame of the vehicle and a lower end; and,
wherein the lower end of the suspension strut of the first suspension support is pivotally connected to the first lower suspension rail, the lower end of the suspension strut of the third suspension support is pivotally connected to the second lower suspension rail and wherein the lower end of the suspension strut of the second suspension support is pivotally connected to the first lower suspension rail, the second lower suspension rail or the first and second lower suspension rails proximal the central pivot.

12. The suspension of claim 11, wherein the lower end of the suspension strut of the second suspension support is pivotally connected to the first and second lower suspension rails at the central pivot.

13. The suspension of claim 11, wherein each suspension support further comprises an upper support bracket pivotally connected to an upper end of the resilient element and the upper end of the suspension strut.

14. The suspension of claim 13, wherein:
a four bar linkage is formed for the first suspension support that comprises the suspension strut, the upper support bracket, the resilient element and the first lower suspension rail;
a four bar linkage is formed for the second suspension support that comprises the suspension strut, the upper support bracket, the resilient element and the first lower suspension rail; and,
a four bar linkage is formed for the third suspension support that comprises the suspension strut, the upper support bracket, the resilient element and the second lower suspension rail.

15. The suspension of claim 13, wherein each upper support bracket is fixedly attached to its respective suspension strut and pivots with the suspension strut in a first direction, and the resilient element is compressed by rotation of the upper support bracket in the first direction while the vehicle is at rest.

16. The suspension of claim 11, wherein each suspension support further comprises a lower support bracket pivotally connected to a lower end of the resilient element and configured to connect the lower end of the resilient element to its respective lower suspension rail, wherein the suspension strut is pivotally connected to a top or bottom side of the respective lower suspension rail and wherein the lower support bracket is connected to an opposite side of the respective lower suspension rail as compared with the suspension strut.

17. The suspension of claim 16, wherein:
the resilient element of the first suspension support is pivotally connected to the bottom side of the first lower suspension rail by the lower support bracket and the suspension strut of the first suspension support is pivotally connected to the top side of the first lower suspension rail;
the resilient element of the second suspension support is pivotally connected to the bottom side of the first lower suspension rail by the lower support bracket and the suspension strut of the second suspension support is pivotally connected to the top side of the first and second lower suspension rails; and
the resilient element of the third suspension support is pivotally connected to the bottom side of the second lower suspension rail by the lower support bracket and the suspension strut of the third suspension support is pivotally connected to the top side of the second lower suspension rail.

18. The suspension of claim 11, wherein the lower end of each suspension strut is pivotally connected to its respective lower suspension rail via a pivot structure comprising a pivot shaft having a pivot axis and a resilient annular bushing concentric with the pivot axis, wherein deflection of the pivot shaft from concentric alignment with the pivot axis is resisted by the resilient annular bushing, and wherein the pivot structure further comprises a pivot housing circumferentially disposed about the resilient annular bushing and wherein the pivot structure is located above its respective lower suspension rail.

19. The suspension of claim 11, wherein the plurality of track idler wheels comprises pairs of idler wheels connected to one another to form an idler wheel assembly and wherein each idler wheel assembly is independently suspended from a bottom side of the first or second lower suspension rail.

20. The suspension of claim 19, wherein each idler wheel assembly is independently resiliently suspended from the bottom side of the first or second lower suspension rail, and one of the pair of idler wheels is removable from its respective idler wheel assembly while the idler wheel assembly is suspended from the bottom side of the first or second lower suspension rail and while the other idler wheel remains engaged with the track.

* * * * *